(12) United States Patent
Jacobs

(10) Patent No.: US 7,859,139 B2
(45) Date of Patent: Dec. 28, 2010

(54) CONTROLLED MOTION SYSTEM

(76) Inventor: Keith G. Jacobs, 10163 Meadowknoll Dr., Loveland, OH (US) 45140

( * ) Notice: Subject to any disclaimer, the term of this patent is extended or adjusted under 35 U.S.C. 154(b) by 127 days.

(21) Appl. No.: 12/178,603

(22) Filed: Jul. 23, 2008

(65) Prior Publication Data
US 2009/0026846 A1 Jan. 29, 2009

Related U.S. Application Data

(60) Provisional application No. 60/951,282, filed on Jul. 23, 2007.

(51) Int. Cl.
*H02K 41/02* (2006.01)
(52) U.S. Cl. .................. 310/12.09; 310/12.11
(58) Field of Classification Search ............. 310/12.09, 310/12.11, 12.19, 17–20, 37; 198/831, 841
See application file for complete search history.

(56) References Cited

U.S. PATENT DOCUMENTS

| 3,669,247 A | * | 6/1972 | Pulver ......................... 198/841 |
| 3,708,059 A | * | 1/1973 | Ackermann .................. 198/841 |
| 3,788,455 A | * | 1/1974 | Dieckmann, Jr. ............. 198/831 |
| 4,720,008 A | * | 1/1988 | Ufland ......................... 198/841 |
| 5,237,252 A | * | 8/1993 | Tanaka et al. ................ 318/587 |
| 5,606,256 A | * | 2/1997 | Takei ..................... 324/207.21 |
| 5,810,153 A | * | 9/1998 | Zimmerman et al. ........ 198/495 |
| 6,085,496 A | * | 7/2000 | Fontanazzi et al. ............ 53/551 |
| 6,876,107 B2 | * | 4/2005 | Jacobs ..................... 310/12.19 |
| 6,876,896 B1 | * | 4/2005 | Ortiz et al. ................... 700/112 |

\* cited by examiner

*Primary Examiner*—Thanh Lam
(74) *Attorney, Agent, or Firm*—Lafkas LLC; David M. Lafkas

(57) ABSTRACT

A controlled motion system with movers mounted on a hybrid track system comprised of at least one smart section and at least one dumb section. The smart sections control each mover independently, while the dumb sections drive all movers at the same speed. The transition between these sections is characterized by positive control of the movers at all points in the transition. A soft magnetic composite core for the smart sections is disclosed. Also, a single-sided mover for smart sections that is constrained against loads in all direction, except for the direction of motion, is disclosed.

4 Claims, 7 Drawing Sheets

CONTROLLED MOTION SYSTEM

CROSS-REFERENCE TO RELATED APPLICATIONS

This application claims the benefit of U.S. Provisional Application No. 60/951,282 filed Jul. 23, 2007, the content of which is expressly incorporated herein by reference thereto.

BACKGROUND OF INVENTION

The present invention relates to controlled motion systems. Some aspects of the invention relate more specifically to controlled motion systems capable of independently controlling multiple movers on a track. The invention can be applied to controlled motion systems of the type disclosed in U.S. Pat. No. 6,876,107 issued Apr. 5, 2005 to Jacobs or U.S. Pat. No. 6,191,507 issued Feb. 20, 2001 to Peltier et al., both of which are incorporated herein fully by reference.

These prior art systems have several limitations that the present invention overcomes. One limitation is on nonlinear sections. On one type of prior art system, linear and nonlinear shaped sections are employed to create a path over which movers travel. This type of system uses "smart" sections which can independently control the motion of each mover on the section and "dumb" sections which drive each mover at the same speed. These dumb sections typically employ a rotary axis that drives movers with either a magnetic or mechanical coupling to the mover. A key problem with this prior art system is that in the transition zone from the "smart" to the "dumb" sections positive control of the mover is not maintained. This means it is possible for a mover to get stuck with no means of recovery other than operator intervention, which causes down time and lost production.

In another type of prior art system, a nonlinear or curvilinear shaped section is fabricated using a wedge-shaped, solid metal core, pole piece. This design suffers from large eddy currents leading to braking and loss of efficiency.

In another type of prior art system, a single-sided mover (magnets on only one side of a motor section), such as those taught in U.S. Pat. No. 6,191,507, is used. A key problem with these prior art single-sided movers is that they are not fully constrained against applied loads in any direction. Specifically, if a load greater than magnet preload is applied opposite the preload, the mover carriage will unseat. This prevents the track from being mounted in an arbitrary orientation or prevents the mover from being loaded with a load from an arbitrary direction because the mover might fall off the track.

SUMMARY OF THE INVENTION

The present invention relates to controlled motion systems, which can be employed to control the movement, force and operation of a tool, payload or other items that need to be moved to affect a process. More specifically, to controlled motion systems that can independently control multiple moving elements along at least a portion of a path.

One preferred embodiment includes a hybrid track system that is comprised of "smart" and "dumb" sections characterized by a transition zone in which positive control of the mover is maintained throughout the transition. This embodiment preferably includes the ability to merge and divert movers onto multiple paths. The "smart" sections are characterized by the ability to independently control each mover on it. An example of this type of motor is disclosed in U.S. Pat. No. 6,876,107 issued Apr. 5, 2005 to Jacobs.

In another preferred embodiment soft magnetic composite materials are used for the motor core of the controlled motion system. This advantageously allows nonlinear shaped smart sections with complex core geometries to be utilized without the large core losses of prior art systems. Also, soft magnetic composite cores allow the windings to be directly wound onto the core pole pieces and then assembled into the motor core, reducing assembly costs.

In another preferred embodiment, single-sided, fully constrained movers are disclosed that allow an arbitrary load on the mover and further allowing the track to be mounted in an arbitrary orientation.

BRIEF DESCRIPTION OF THE DRAWINGS

The foregoing and other aspects of the invention are discussed in greater detail below with reference to the drawings, provided for the purpose of description and not limitation, where like objects are referenced by like reference numbers, and wherein.

DETAILED DESCRIPTION OF THE INVENTION

Figure 1:
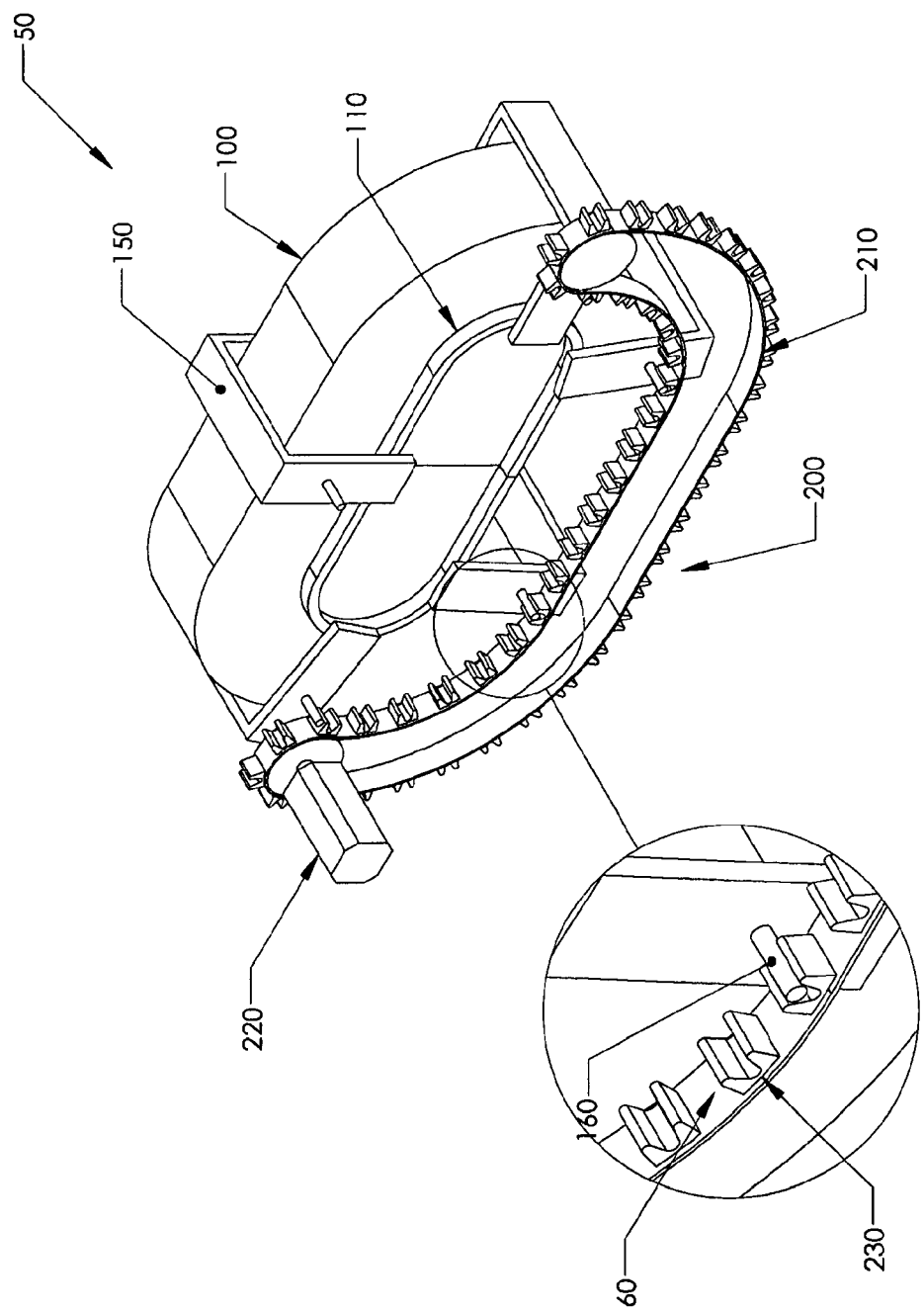
FIG. 1 illustrates a perspective view of a hybrid track according to the present invention, utilizing a belt drive for the dumb section.

FIG. 1 illustrates a preferred embodiment of a hybrid track system 50, comprised of at least one "smart" section 100 and at least one "dumb" section 200. Movers 150 are movably mounted on bearing system 110 such that the movers are constrained to transverse a path defined by this bearing system 110. A "smart" section 100 is characterized by its ability to independently control each of the movers 150 that is in its realm of control. This type of motor section is disclosed in U.S. Pat. No. 6,876,107. In contrast, a "dumb" section 200 lacks the ability to independently control each of the movers 150 and drives all of the movers 150 in its realm of control at the same speed.

In a preferred embodiment, dumb section 200 comprises a belt or chain 210 driven by a rotary motor 220. The belt or chain 210 has at least one driving feature 230 that couples to a driven feature 160 on the movers 150 so that movers 150 can be driven along the dumb section 200. In the illustrated embodiment, the driven feature 160 comprises a pin on the mover and the driving feature 230 comprises a complementary lug on the belt 210. The driving feature 230 and driven feature 160 are collectively referred to as the coupling feature 60. In alternative embodiment, a different coupling feature 60 is employed, utilizing a magnet for the driving feature 230 and metal lug mounted on the mover 150 for the driven feature 160. Other types of coupling features could be employed and are within the scope of this invention.

Figure 2:
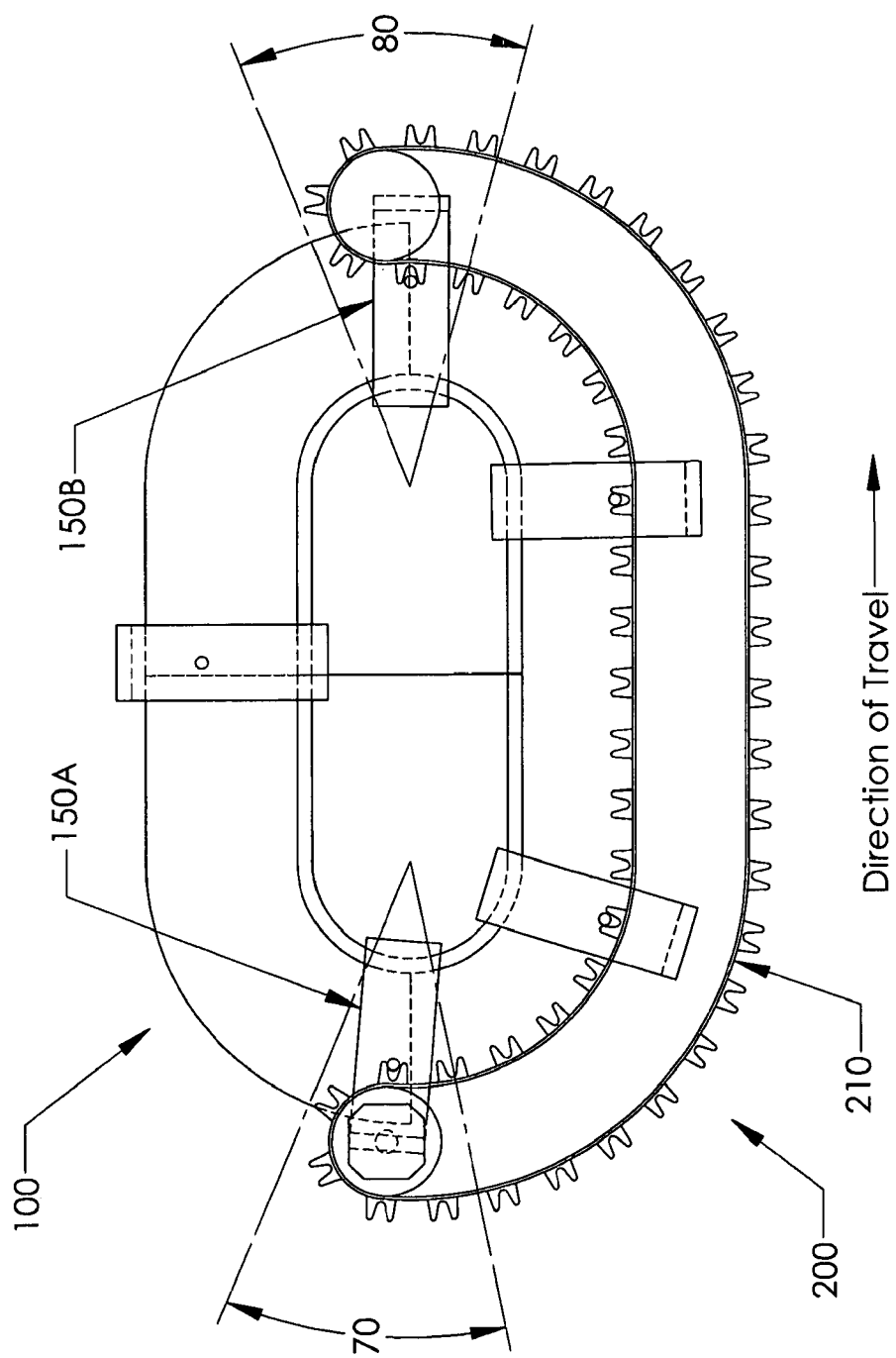
FIG. 2 presents a side view of the same hybrid track as FIG. 1, highlighting the transition zones between the smart and dumb sections.

Referring to FIG. 2, mover 150A is shown in a transition zone 70 between a smart section 100 and a dumb section 200. While in transition zone 70, driving feature 230 engages the driven feature 160 on mover 150A while it is still being driven by the smart section 100 so that the transition onto the dumb section 200 is done under positive control at all points in transition zone 70. The belt 210 then drives each mover 150 on the dumb section 200 around to the next transition zone 80. In this transition, the smart section 100 engages the mover 150B while it is still under the control of the dumb section 200 to once again ensure a transition with positive control at all times. The transition zones 70 and 80 between the smart sections 100 and dumb sections 200 are characterized by positive control of movers 150 at all points in the transition so that movers 150 can never be stuck or stranded in transition zones 70 or 80.

Figure 3:
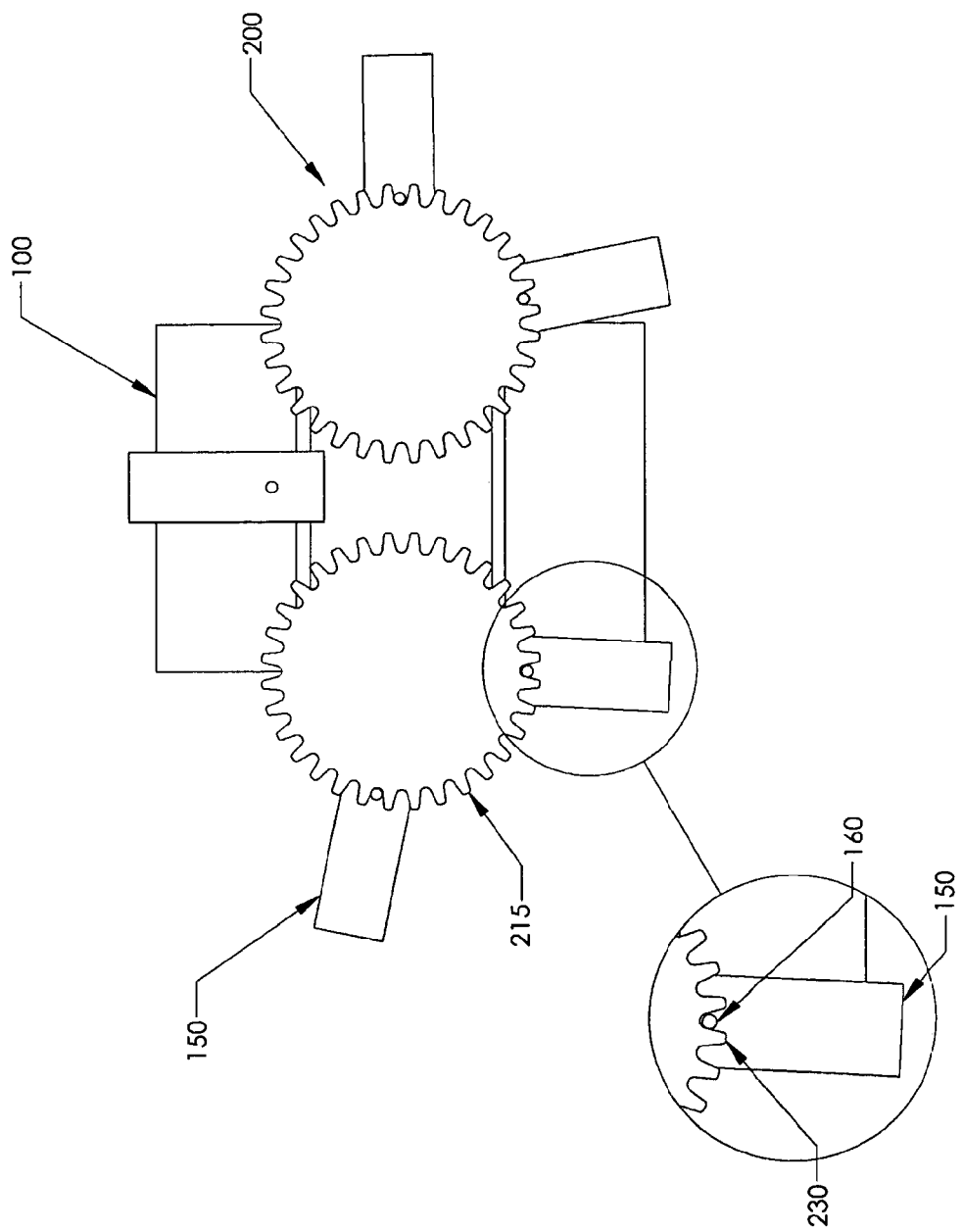
FIG. 3 presents a side view of another preferred embodiment of the hybrid track which utilizes sprockets for the driving feature in the dumb section.

FIG. 3 illustrates another preferred embodiment of the present invention. In this embodiment, a sprocket 215 is mounted on each end of the track and acts as the drive mechanism for the dumb section 200. As before, smart section 100 provides independent control of the movers 150. In a transition zone, driving feature 230, which is operably associated with sprocket 215, engages driven feature 160 to provide positive control at all points in the transition.

Figure 4:
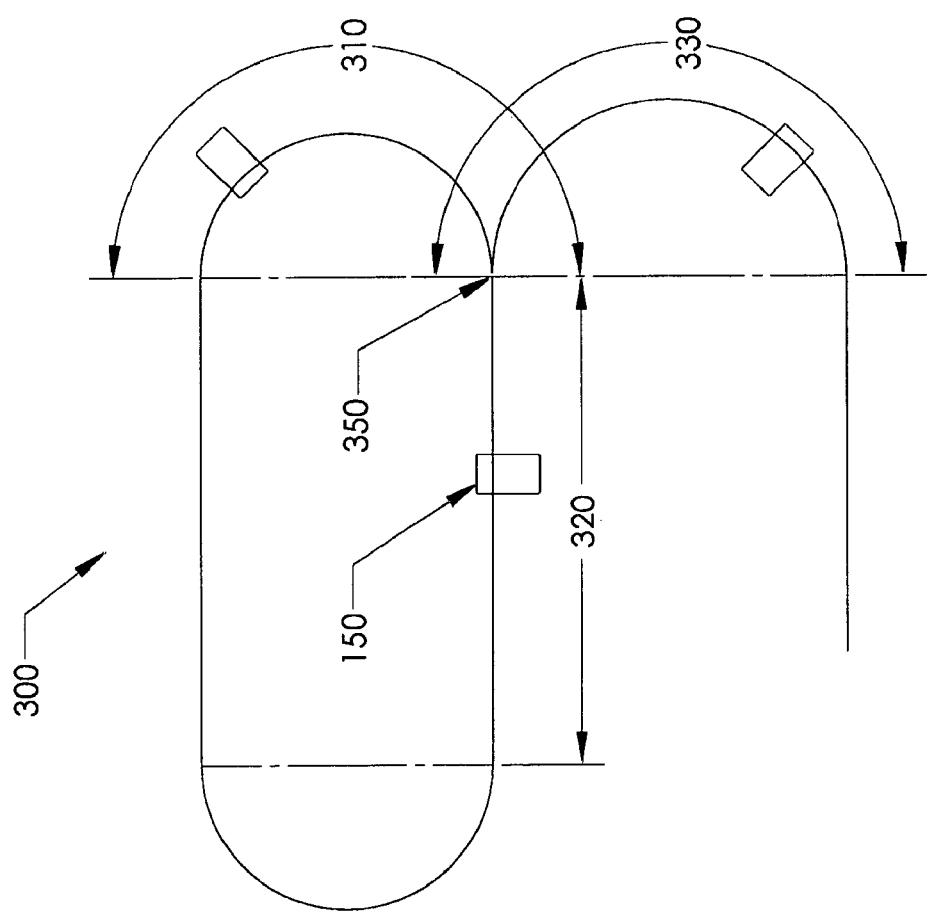
FIG. 4 illustrates a hybrid track with multiple paths and at least one switching element to divert movers onto from one path to another.

FIG. 4 presents another preferred embodiment in which the hybrid track sections are arranged to create multiple paths so that movers can be independently diverted or merged onto at least one of these multiple paths. In this embodiment, a track 300 is comprised of at least three path segments, denoted 310, 320 and 330. These path segments can be comprised of any combination of smart and dumb sections, as needs. Mover 150 is mounted for motion on track 300. As mover 150 travels along path segment 320 and approaches the junction of path segments 310, 320 and 330, a switching element 350 can activate to switch mover 150 from first path segment 320 onto either second path segment 310 or onto a third path segment 330. Obviously, mover 150 can return to the first path segment 320 by reversing its course. The location of switching element 350 is arbitrary and can be placed anywhere on a path, such in between smart sections, in between dumb sections or in between smart and dumb sections.

Figure 5:
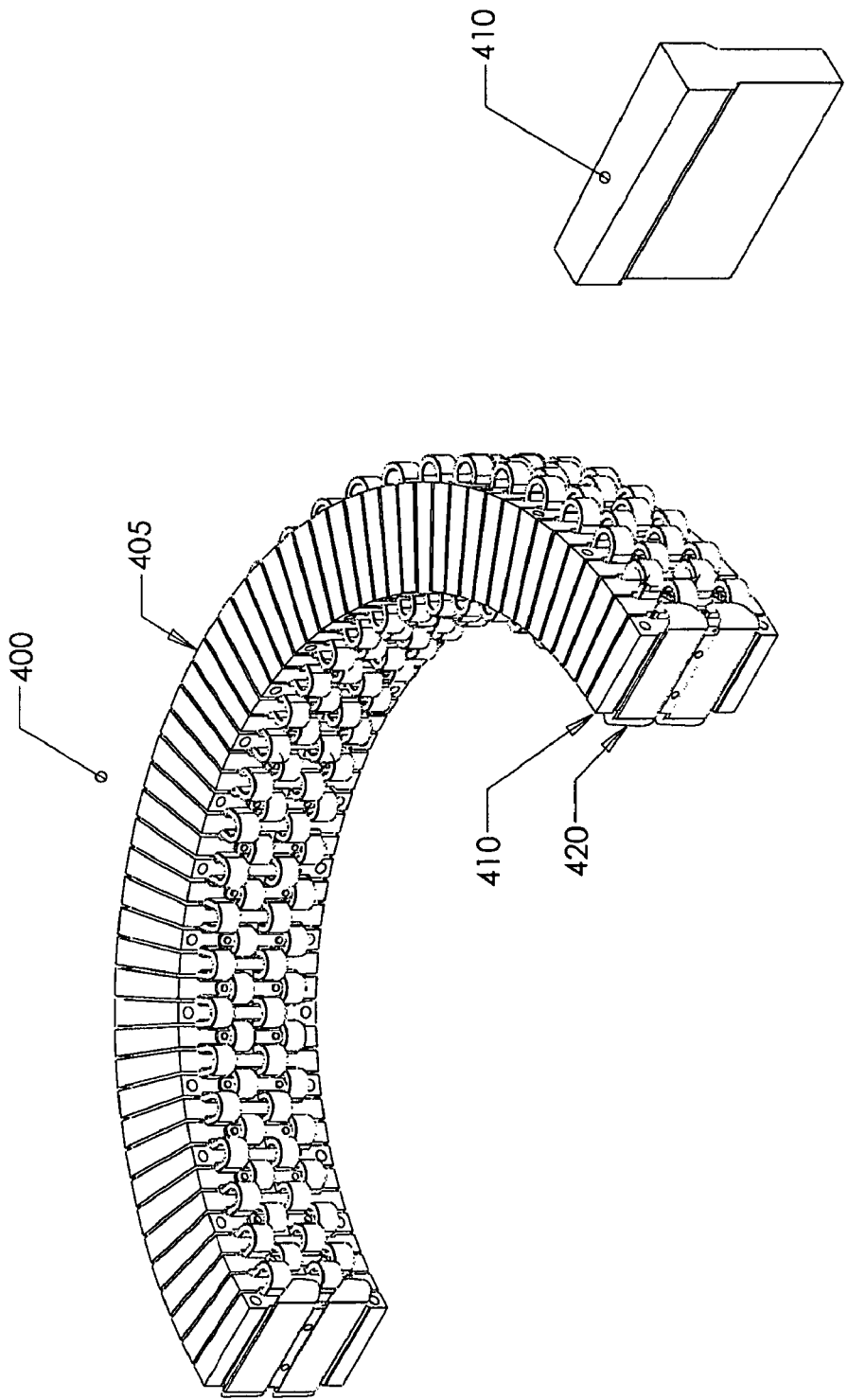
FIG. 5 illustrates a nonlinear shaped motor core fabricated from complex geometry, soft magnetic composite pole pieces according to a preferred embodiment of the present invention.

FIG. 5 illustrates another preferred embodiment of the present invention. In this embodiment, nonlinear smart section 100 employs a nonlinear shaped stator 400 that is comprised of a nonlinear shaped core 405. Said core 405 is further comprised of a plurality of pole pieces 410. Coils 420 are wound around each of said pole pieces 410. In the illustrated embodiment, the pole pieces 410 are wedge shaped to create a curved shape for stator 400. However, pole pieces 410 are not limited to the wedge shape depicted and could be of any arbitrary geometry to create any arbitrary shape for core 405.

While it is known in the art to stack laminated electrical steel to create a core for a motor or generator, doing so for a arbitrary shape, such as pole piece 410, is expensive to manufacture. The present invention overcomes this problem by utilizing Soft Magnetic Composite (SMC) materials to fabricate pole piece 410. SMC's are insulation-coated, ferrous, powder metal materials that can be molded to net shape or near net shape components. SMC materials are commercially available from Hoganas SA and other sources. In an alternative embodiment, the entire core 405 could be manufactured as a single piece.

In a preferred embodiment, the coil 420 is wound directly onto pole piece 410. This advantageously eliminates the need to insert coil 420 after core 405 is assembled, reducing cost and time. This could be advantageous even for a traditional core that is currently laminated because it eliminates the cost and time to insert the windings.

In another preferred embodiment, core 405 comprises SMC pole piece 410 and is insulated from coil 420 with an epoxy coating, such as those commercially available from 3M™ under the trade name Scotchcast™ Powder Epoxy Coatings. Alternatively, a lining material such as Dupont Nomex or DMD could be utilized to provide an insulator between pole piece 410 and coil 420.

Figure 6:
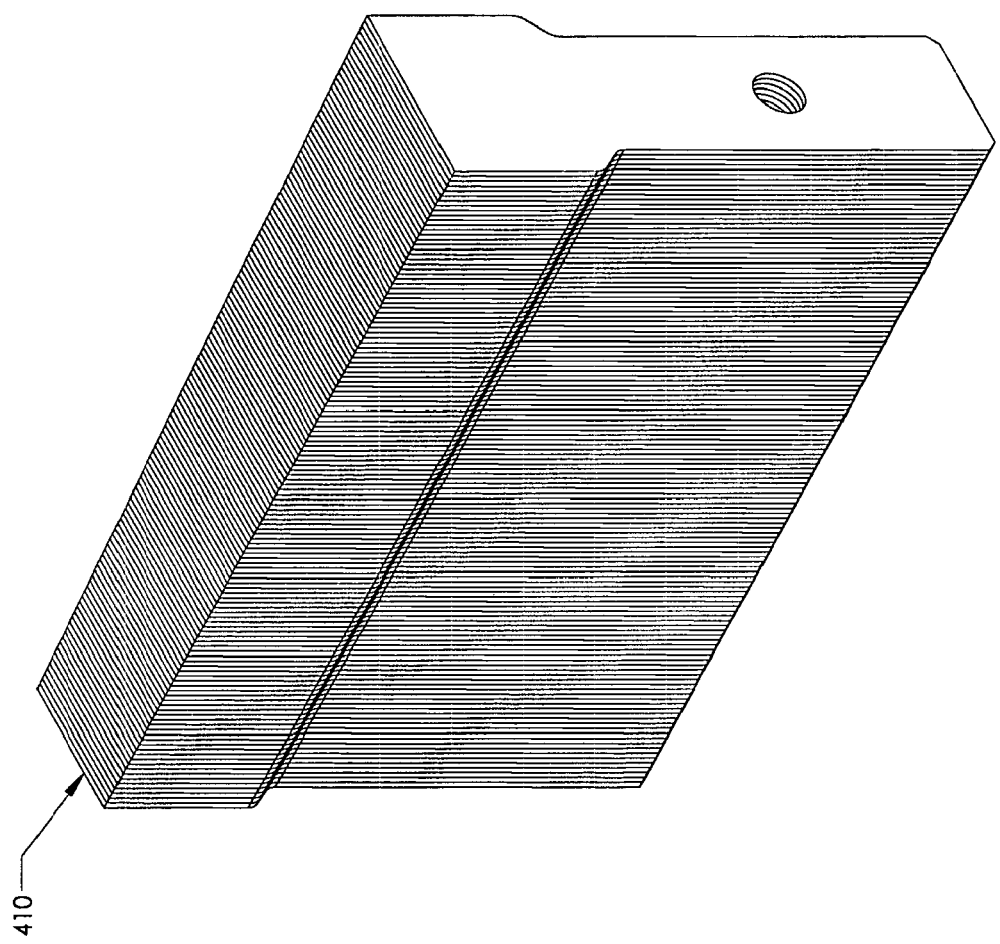
FIG. 6 illustrates a wedge-shaped laminated pole piece for use in a nonlinear shaped core according to an alternative embodiment.

In an alternative embodiment, as illustrated in FIG. 6, pole piece 410 is fabricated from a stack of laminated sheets and then machined to the desired geometry. As mentioned above, this is less desirable than using SMC, but it is still a technically viable approach.

Figure 7:
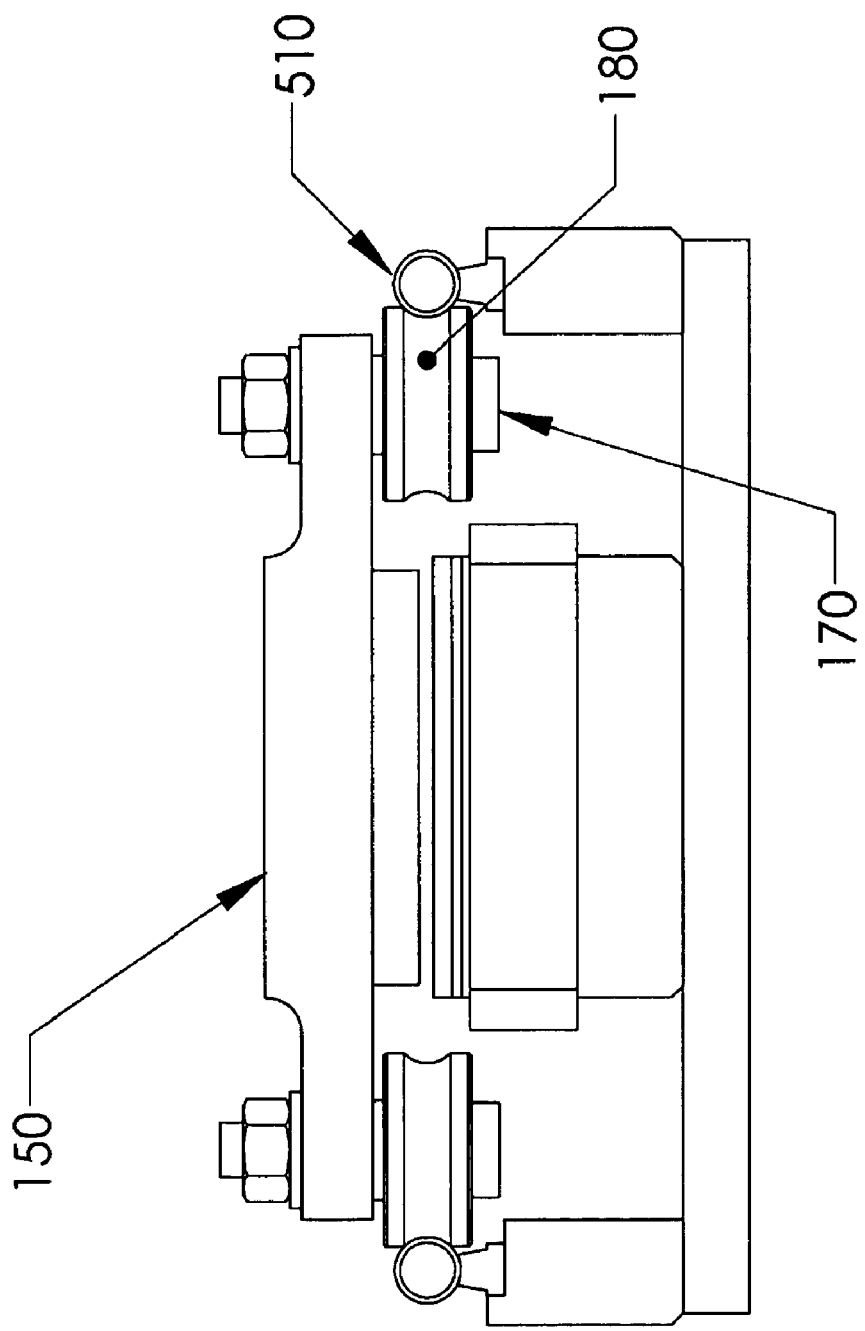
FIG. 7 illustrates a single-sided mover that is fully constrained by its bearing system against a load from all directions except for the direction of motion according to a preferred embodiment of the present invention.

FIG. 7 illustrates a preferred embodiment of the present invention. In this embodiment, a single-sided mover 150 is mounted for motion on a bearing rail 510 with bearings 170 that fully constrains the mover against loads from any direction, except for the direction of motion along the track. Mathematically, this is defined as being constrained in 5 of the 6 degrees of freedom for a free body. A preferred embodiment of bearings 170 are concave track rollers 180 running on a round rail 510 as illustrated in FIG. 7. Other embodiments utilizing other rolling bearing elements, air bearings or magnetic bearing could be employed and are included within the scope of this invention.

Preferred embodiments have been disclosed with a certain degree of particularity for the purpose of description, but not of limitation. Those skilled in the art will appreciate that numerous modifications and variations can be made to these embodiments without departing from the spirit and scope of the invention.

What is claimed is:

1. A controlled motion system, comprising:
a track;
a plurality of movers movably mounted on the track for moving along a path;
at least one smart section, further comprising active and reactive elements associated with the track and movers and configured for driving and controlling the movers independently along at least one first segment of the path;
at least one dumb section configured for driving and controlling the movers along at least one second segment of the path;
at least one coupling feature comprising a driving feature on the dumb section for engaging and operably driving a driven feature on the movers such that positive control of each mover is maintained throughout its transition from the first segment to the second segment of the path;
at least one controller operably associated with the active elements of the smart section and the at least one dumb section that provides positive control of the movers at all points along the first and second path segments.

2. The system of claim 1, where:
the at least one coupling feature is comprised of mechanical elements.

3. The system of claim 1, where:
the at least one coupling feature is comprised of magnetic elements.

4. The system of claim 1, further comprising:
a first path segment;
a second path segment;
a third path segment
and a switching element which diverts movers traveling on the first path segment onto either the second path segment or the third path segment.

* * * * *